United States Patent Office 3,006,356
Patented Oct. 31, 1961

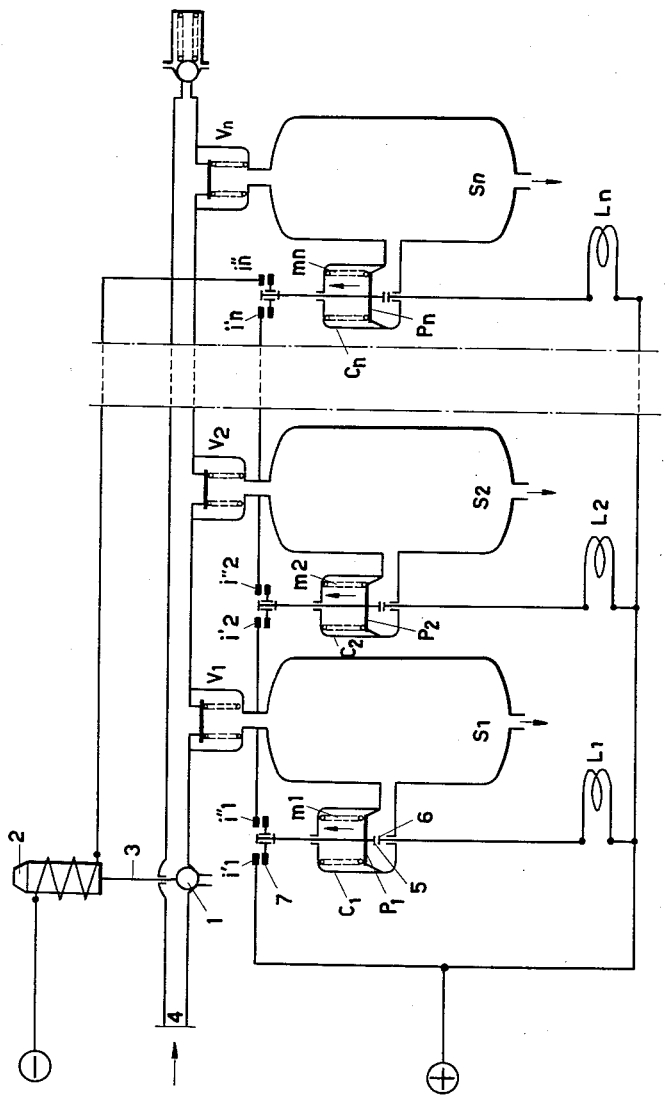

3,006,356
CONTROL OF THE IDLE VALVE OF A COMPRESSOR HAVING A PLURALITY OF RECEIVER SECTIONS
Giuseppe Alfieri, Milan, Italy, assignor to Fabrica Italiana Magneti Marelli, Milan, Italy, a company of Italy
Filed Feb. 8, 1957, Ser. No. 639,054
Claims priority, application Italy June 28, 1956
6 Claims. (Cl. 137—108)

The invention relates to valve control devices for pneumatic installations, and more particularly to devices for the automatic control of the idle valve for a compressor in compressed fluid equipment with any number of sections.

Devices of the above kind have already been described in applicant's Italian Patent No. 527,442. In those devices the feeding of compressed fluid to a pneumatic installation takes place by way of a single conduit provided with a special valve which in turn is controlled by the pressure of the fluid which under determined conditions acts upon said valve in such a manner as to create for the compressor the desired operating conditions (idle or no-load running; running with load).

The present invention has the purpose of improving the invention of the above mentioned patent for compressed fluid equipment such as for instance those for the braking of vehicles, and having a pneumatic circuit constituted by a number of depending sections each of which is constituted essentially by a tank, and by utilization members.

The invention is characterized in that all of the sections of the pneumatic equipment are fed by a single compressor which will be at a no-load running condition only when it has brought to a predetermined value the pressure of the fluid contained in each tank, and in that the lowering of the pressure in any of the sections determines automatically the restoration of the load operation of the compressor, whence the desired pressure for the compressed fluid results in any section always comprised between narrow limits.

In the accompanying drawing there is represented a diagrammatic illustration of a device according to the present invention.

The device comprises a valve 1 which is preferably a ball valve, controlled by an electromagnet 2 by means of a rod 3. Said valve 1 blocks communication with the atomsphere of the conduit 4 which coming from a compressor (not shown) feeds through check valves V1, V2, . . . V$n$, tanks $s1$, $s2$, . . . $sn$ of the equipment.

Moreover, the device comprises pneumatic-control double switches C1, C2, . . . C$n$, which are in communication with the respective tanks and in which movement of operating members P1, P2, . . . P$n$ is opposed by the action of springs $m1$, $m2$, . . . $mn$.

On examining one of the double switches, for instance C1, it will be noted that the stem of the operating member associated therewith carries a mobile contact 5 adapted to contact fixed contact 6 connected in turn to a low pressure signalling member preferably constituted by a warning lamp L1.

At the other end of the stem of the operating member C1 there is associated a convenient contact 7, adapted to establish, under determined conditions, a connection between two fixed contacts $i'1$ and $i''1$.

The pair of fixed contacts $i'1$; $i''1$; $i'2-i''2$; . . . $i'n-i''n$, are inserted in series in a circuit which receives its positive voltage from $i'1$ and is connected to a relatively negative or ground potential by way of the electromagnet 2.

Operation of the device is as follows:

The compressed fluid, coming in from the compressor by way of conduit 4, passes through the check valves V1, V2, . . . V$n$ to the tanks $s1$, $s2$, . . . $sn$ of the equipment and then to the operating members of the double switches C1, C2, . . . C$n$, and exerts on said members a fore which increases proportionally to the pressure. As long as the pressure in the individual tanks does not attain a predetermined value, the contacts 5 and 6 of each section, touch and, therefore, the corresponding lamps L$n$ are lighted because each is directly connected at one side with the positive voltage source and at the other side with its own negative contact 5.

It is clear that such signalling is not effected for the sections in the tanks of which the predetermined pressure has been attained or surpassed. In fact, when said pressure is such as to overcome individually the action of the springs $m1$, $m2$, . . . $mn$, the operating members stressed will shift as indicated by the arrows in the members C to break the connection between the contacts 5 and 6 and, therefore, to extinguish the low pressure warning lamps L1, L2, . . . L$n$.

If then the pressure in any of the tanks has surpassed the maximum limit pre-determined for the normal use of the compressed fluid, the operating members P1, P2, . . . P$n$, will have shifted to bring the respective contacts 7 into contact with corresponding contacts $i'1-i''1$, $i'2-i''2$, . . . $i'n-i''n$. Only if all of those pairs of contacts are closed, that is, when the pressure of the fluid contained in every tank has attained the same maximum limit values, will the feeding circuit for the electromagnet 2 be closed; said electromagnet on becoming energized will open the valve 1 for starting the no-load (idling) operation of the compressor. Under this condition, however, it will suffice that in one of the tanks S1, S2, . . . S$n$, there occurs a lowering of pressure from the aforesaid limit value whereby a contact 7 associated with the member for operating the tank involved breaks the feeding circuit of the electromagnet 2 and causes de-energizing and, therefore, closing of the valve 1.

In fact, if pressure is reduced in one of the tanks, the value of the pressure acting upon the operating member connected therewith will also be reduced and will open the contacts $i'-i''$ previously closed thereby.

As a consequence, under normal operating conditions, the drawing off of fluid from any tank (or section) determines automatically the immediate restoration of the load condition of the compressor, thus eliminating the inconvenience objected to in conventional pneumatic equipment with multiple sections as well as the inconveniences due to the drawing off of fluid from a section which does not control the idling valve so that said section is discharged without control.

The invention has been illustrated with reference to the accompanying drawing which, however, is only illustrative and does not limit the scope of the invention, which is susceptible of variations within the scope of the following claims.

What is claimed is:

1. A control for feeding a plurality of tanks comprising a compressor conduit, a valve in said conduit for selectively discharging said conduit, an electrically operated device for controlling said valve, a source of electrical power, an electrical circuit connecting said device with said source, and switches connected in series in said circuit for opening the same; said switches respectively being operatively associated with different ones of said tanks and being responsive to predetermined pressures therein for cooperatively operating said device and a check valve between said conduit and each of said tanks, said valve being responsive to pressure in the associated tank to selectively permit feeding thereof.

2. A control as claimed in claim 1 wherein each switch is a member responsive to the attaining of a predetermined pressure in the associated tank for being closed.

3. A control as claimed in claim 1 comprising a low pressure indicator coupled to each of said switches for indicating predetermined minimum pressures in the tanks.

4. A control as claimed in claim 1 wherein said device is an electromagnet.

5. A control as claimed in claim 1 wherein said switches comprise casings coupled respectively to said tanks, pressure responsive mechanisms in said casings, and movable contacts responsively coupled to said mechanism and positioned in said circuit.

6. A control as claimed in claim 1 wherein said valve is a ball valve discharging into the atmosphere.

References Cited in the file of this patent
UNITED STATES PATENTS

| | | |
|---|---|---|
| 1,680,245 | Penn | Aug. 7, 1928 |
| 2,432,553 | Zilly | Dec. 16, 1947 |
| 2,652,189 | Gorman | Sept. 15, 1953 |